United States Patent [19]
Yang

[11] Patent Number: 6,076,205
[45] Date of Patent: Jun. 20, 2000

[54] PLAYPEN WITH DETACHABLE FRAME SECTIONS

[76] Inventor: Chih-Huang Yang, 7F-1, No. 9-7, Sec. 2, Chung-Kang Rd., Taichung City, Taiwan

[21] Appl. No.: 09/264,662

[22] Filed: Mar. 8, 1999

[51] Int. Cl.[7] .............................. A47D 13/06; A47D 7/00
[52] U.S. Cl. .............................. 5/99.1; 403/344; 403/205
[58] Field of Search .......................... 5/99.1, 93.1, 98.1, 5/282.1; 256/25; 403/344, 205

[56] References Cited

U.S. PATENT DOCUMENTS

| | | | |
|---|---|---|---|
| 2,601,111 | 6/1952 | Foster | 5/99.1 |
| 4,433,447 | 2/1984 | Mathou | 256/25 |
| 5,963,996 | 10/1999 | Hsia | 5/99.1 |

FOREIGN PATENT DOCUMENTS

| | | | |
|---|---|---|---|
| 1557841 | 2/1969 | France | 5/99.1 |

Primary Examiner—Alexander Grosz
Attorney, Agent, or Firm—Brinks Hofer Gilson & Lione

[57] ABSTRACT

A playpen includes a looped lower frame, a looped upper frame, a plurality of couplers, and a plurality of posts. The lower looped frame includes a plurality of interconnected lower frame sections having adjoining ends. The looped upper frame is disposed above the looped lower frame, and includes a plurality of interconnected upper frame sections having adjoining ends. The couplers interconnect the adjoining ends of the upper and lower frame sections. Each of the couplers includes a tubular portion which has two opposite open ends for insertion of a pair of the adjoining ends of the upper and lower frame sections, and a socket portion which projects from the tubular portion between the open ends and which has a socket hole. The posts bridge the upper and lower frames and are connected to the couplers. Each of the posts has two ends respectively supported by the socket portion of a corresponding one of the couplers in the upper frame and the socket portion of a corresponding one of the couplers in the lower frame.

8 Claims, 7 Drawing Sheets

PLAYPEN WITH DETACHABLE FRAME SECTIONS

FIELD OF THE INVENTION

The invention relates to a playpen, more particularly to a playpen with detachable frame sections so as to facilitate transport and storage thereof.

BACKGROUND OF THE INVENTION

Playpens of foldable and non-foldable types are known in the art. Most non-foldable playpens are bulky and thus occupy relatively large storage spaces and are therefore hardly appreciated and liked by city-dwellers. Foldable playpens generally occupy smaller storage spaces and are therefore preferred by the city-dwellers. A plurality of joints and couplers are employed to interconnect the adjoining ends of the frame sections which, in turn, confine looped frames for forming a playpen. Locking devices are employed to prevent folding of the adjoining frame sections. However, accidental actuation of the locking devices may still occur, thereby resulting in folding of the frame sections relative to each other, which action may injure a child playing in the foldable playpen.

SUMMARY OF THE INVENTION

Therefore, the object of this invention is to provide a playpen which has detachable frame sections that are coupled to form looped frames for constructing the playpen. The frame sections are coupled in such a manner to prevent from folding relative to one another to avoid injuring a child in the playpen.

Accordingly, the playpen of this invention includes a looped lower frame, a looped upper frame, a plurality of couplers, and a plurality of posts. The lower looped frame includes a plurality of interconnected lower frame sections having adjoining ends. The looped upper frame is disposed above the looped lower frame, and includes a plurality of interconnected upper frame sections having adjoining ends. The couplers interconnect the adjoining ends of the upper and lower frame sections. Each of the couplers includes a tubular portion which has two opposite open ends for insertion of a pair of the adjoining ends of the upper and lower frame sections, and a socket portion which projects from the tubular portion between the open ends and which has a socket hole. The posts bridge the upper and lower frames and are connected to the couplers. Each of the posts has two ends respectively supported by the socket portion of a corresponding one of the couplers in the upper frame and the socket portion of a corresponding one of the couplers in the lower frame.

BRIEF DESCRIPTION OF THE DRAWINGS

Other features and advantages of this invention will become more apparent in the following detailed description of the preferred embodiments of this invention, with reference to the accompanying drawings, in which.

DETAILED DESCRIPTION OF THE PREFERRED EMBODIMENTS

Figure 1:
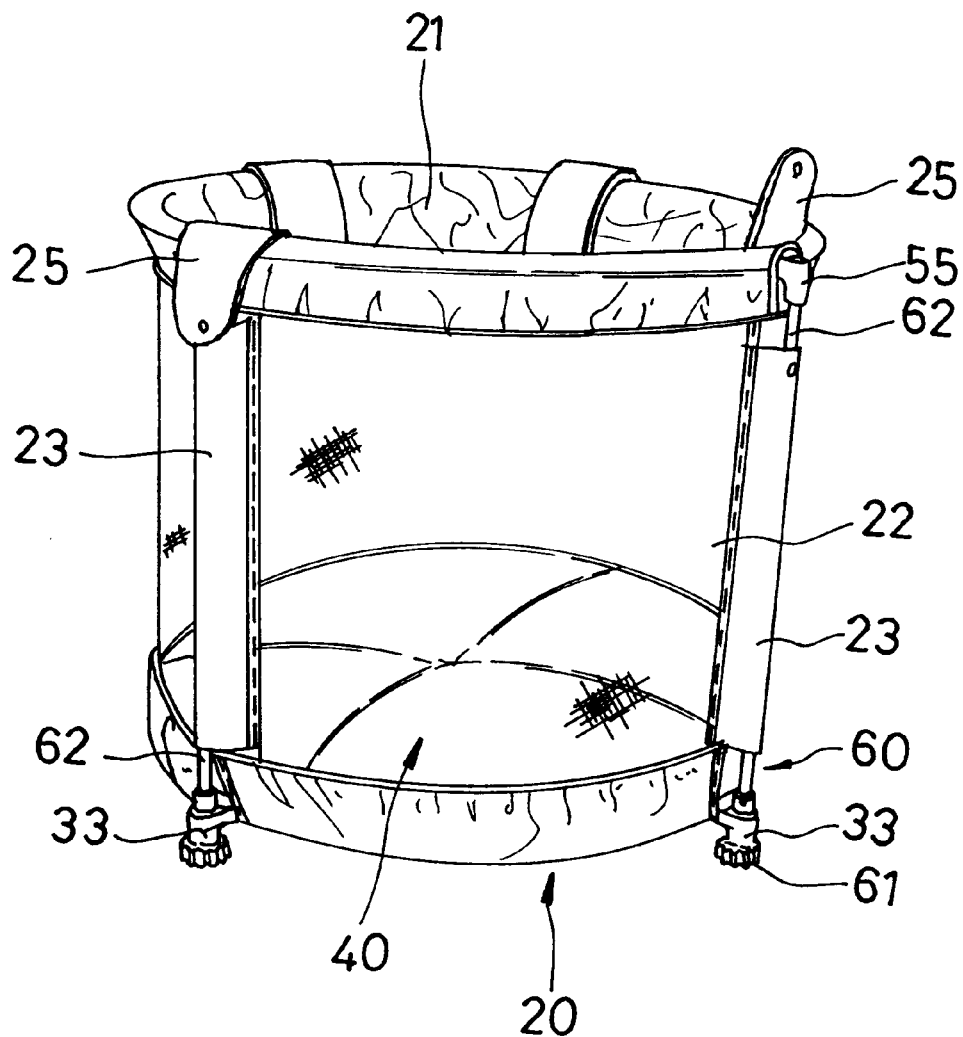
FIG. 1 is a perspective view of a preferred embodiment of a playpen of this invention.
Figure 2:
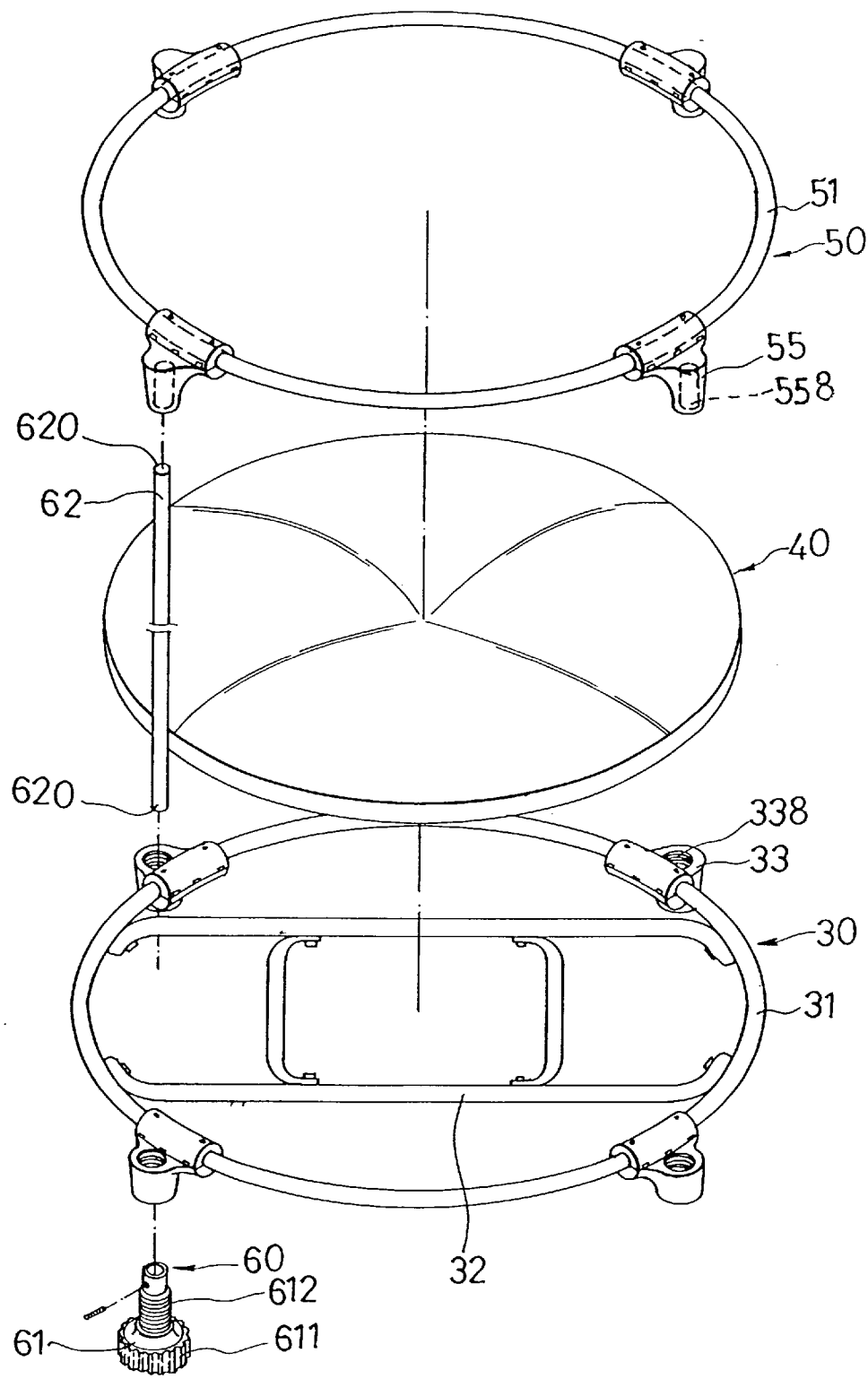
FIG. 2 is an exploded view of the preferred embodiment, wherein a flexible enclosure is removed for the sake of clarity.
Figure 3:
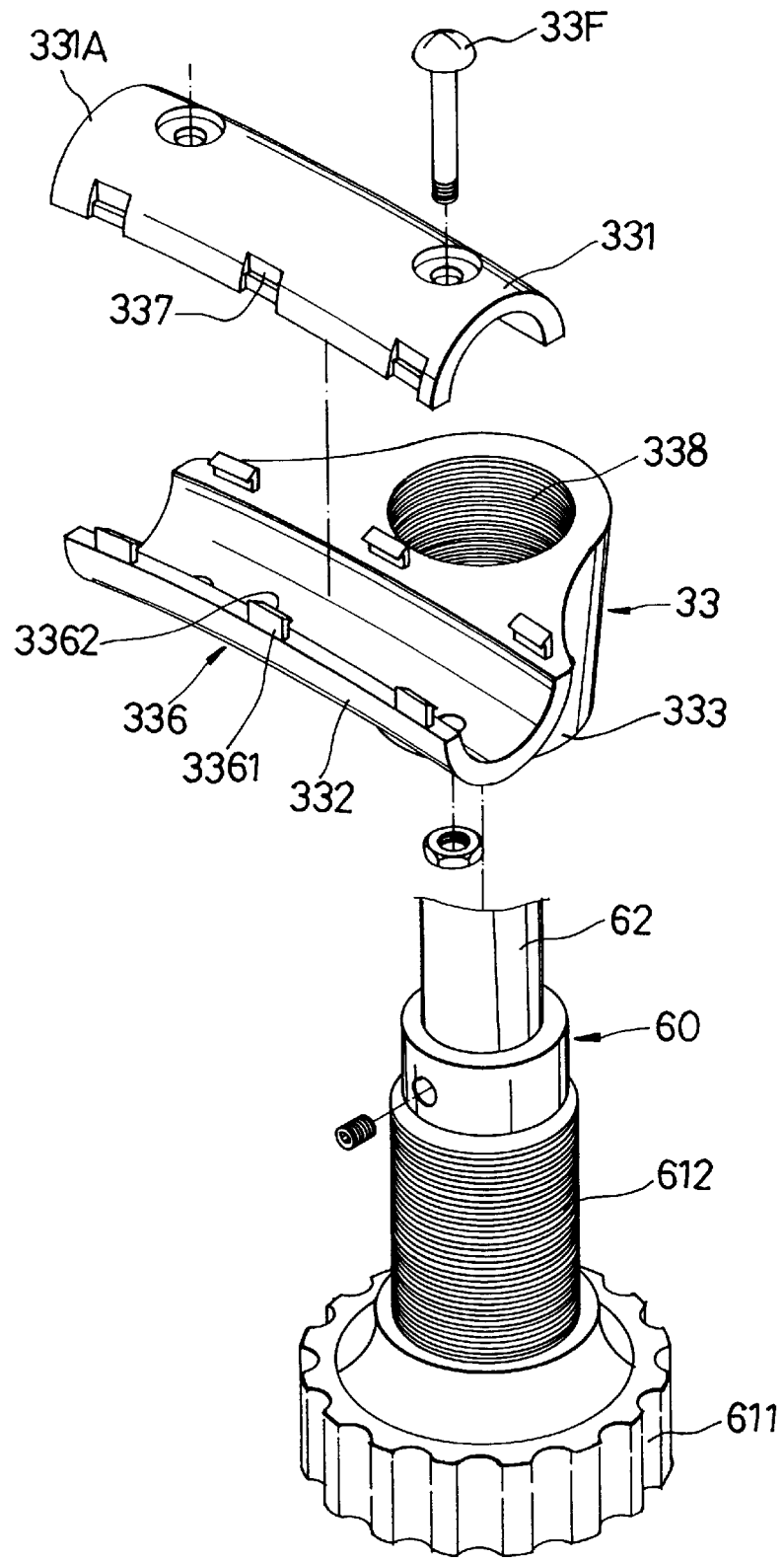
FIG. 3 is an enlarged view of a coupler for coupling adjacent frame sections of a looped lower frame of the preferred embodiment.
Figure 4:
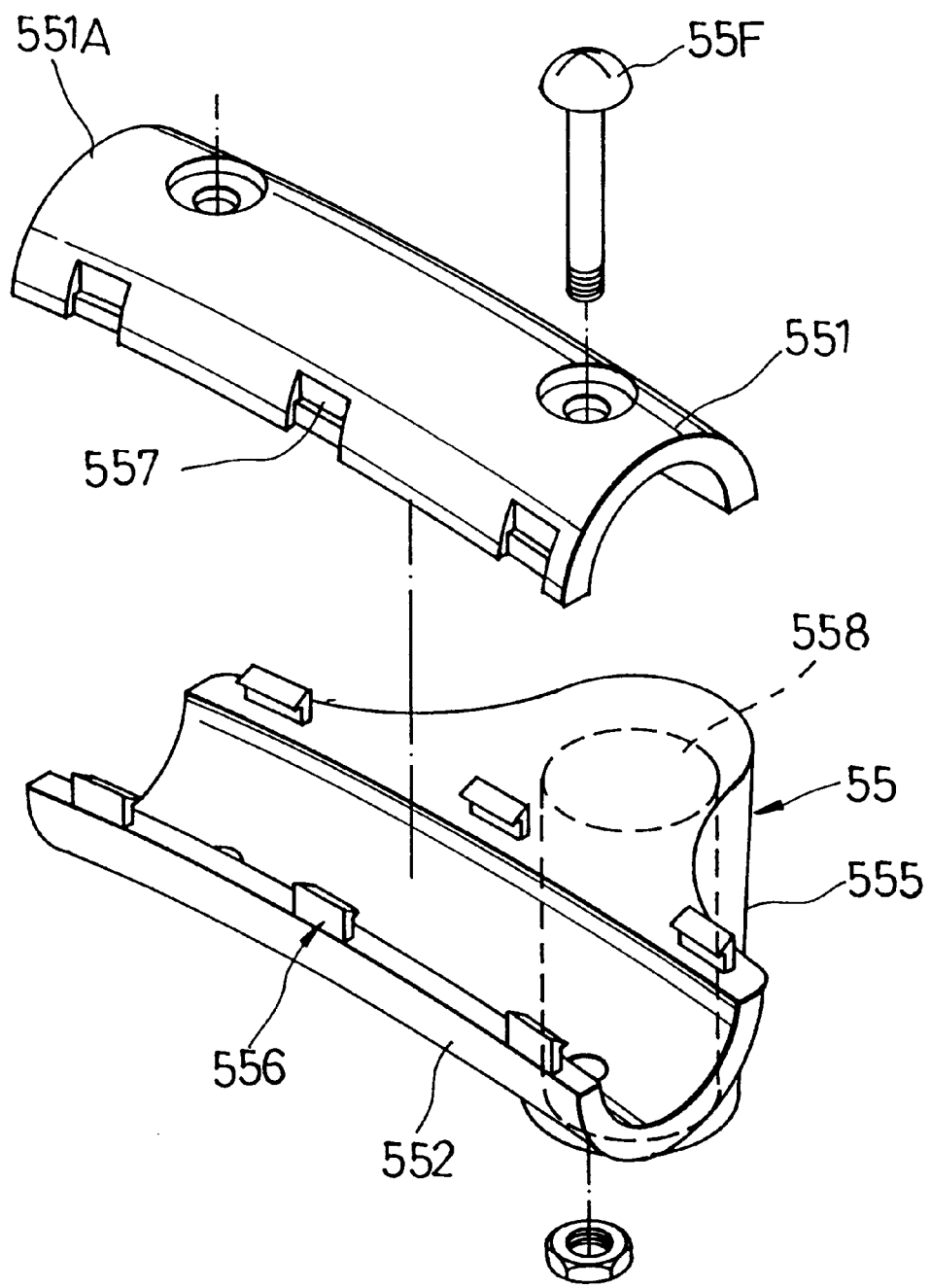
FIG. 4 is an enlarged view of a coupler for coupling adjacent frame sections of a looped upper frame of the preferred embodiment.
Figure 5:
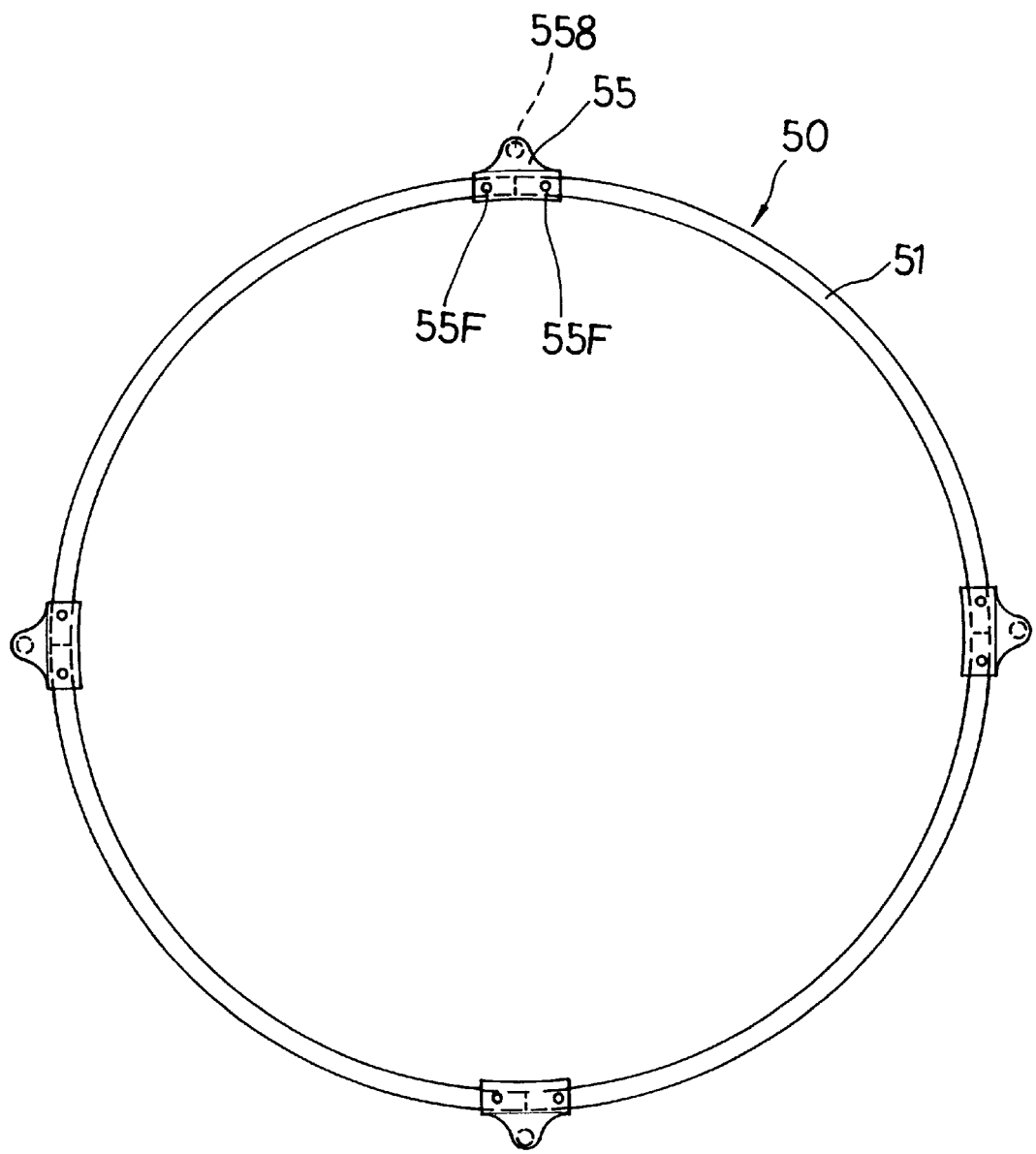
FIG. 5 is top view of the preferred embodiment.
Figure 6:
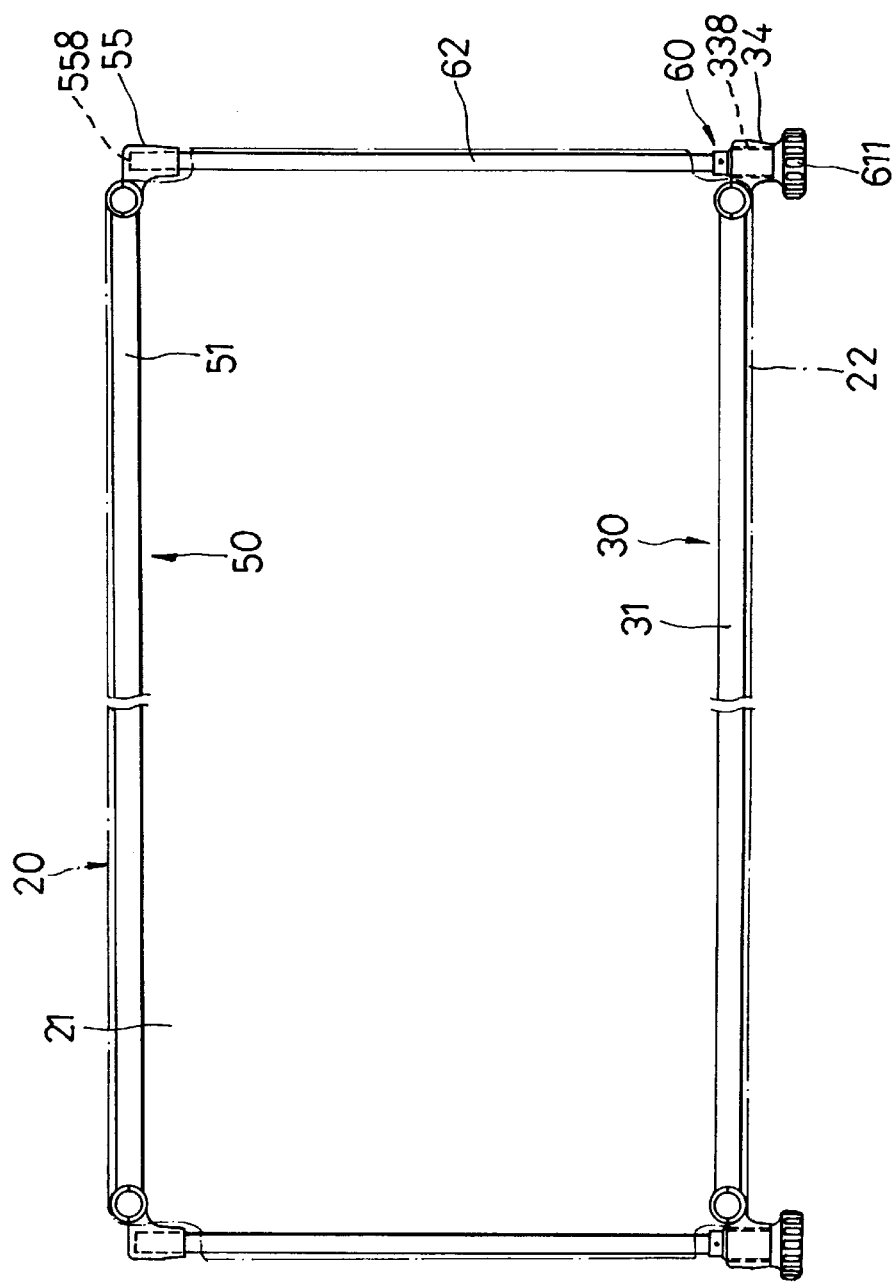
FIG. 6 is a side view of the preferred embodiment, wherein the enclosure is illustrated in dotted lines.

Referring to FIGS. 1, 2, 3 and 4, the preferred embodiment of a playpen 2 according to this invention is shown to include a looped lower frame 30, a looped upper frame 50, a plurality of couplers 33, 55, and a plurality of posts 62.

As illustrated, the looped lower frame 30 includes a plurality of interconnected lower frame sections 31, each of which has opposite adjoining ends.

The looped upper frame 50 is disposed above the looped lower frame 30, and includes a plurality of interconnected upper frame sections 51, each of which has opposite adjoining ends.

The couplers 55, 33 interconnect the adjoining ends of the upper and lower frame sections 51, 31. Each of the couplers 55, 33 includes a tubular portion 551, 331 which has two opposite open ends 551A, 331A for insertion of a pair of the adjoining ends of the upper and lower frame sections 51, 31, and a socket portion 555, 333 which projects from the tubular portion 551, 331 between the open ends of the frame sections 51, 31 and which has a socket hole 558, 338.

The posts 62 bridge the upper and lower frames 50, 30 and are connected to the couplers 55, 33. Each of the posts 62 has two ends 620 respectively supported by the socket portion 555 of a corresponding one of the couplers 55 in the upper frame 50 and the socket portion 333 of a corresponding one of the couplers 33 in the lower frame 30.

In the preferred embodiment, the upper and lower frames 50, 30 are circular. The upper and lower frame sections 51, 31 are formed as arc-shaped tubes while the tubular portions 551, 331 of the couplers 55, 33 are also arched. The socket portions 555, 333 of the couplers 55, 33 project outwardly along radial directions relative to the upper and lower frames 50, 30. The socket holes 558, 338 extend axially in the socket portions 333, 555 for supporting the ends 620 of the posts 62.

Preferably, a brace member 32 is disposed in the lower frame 30 to extend across the lower frame 30. The brace member 32 is connected to two opposing ends of the lower frame sections 31. The socket hole 558 in each of the couplers 55 in the upper frame 50 is a blind bore that receives one of the ends 620 of the corresponding one of the posts 62 (see FIG. 2). The socket hole 338 in each of the couplers 33 in the lower frame 30 is threaded. Each of the couplers 33 in the lower frame 30 has an adjustable foot member 60 that extends through the threaded socket hole 338. The foot member 60 has a pedestal 611, and a threaded hollow stem 612 which extends upward from the pedestal 611 and which is inserted threadedly through the threaded socket hole 338. One end 620 of a corresponding one of the posts 62 is inserted into the hollow stem 62.

The tubular portion 551, 331 of each of the couplers 55, 33 includes two halves 552, 332 of semi-circular cross-section. The socket portions 555, 333 are integrally connected to one of the halves 552, 332. The tubular portion 551, 331 further includes a plurality of snap hooks 556, 336 disposed on one of the halves 552, 332 at diametrically opposing positions, and a plurality of recesses 557, 337 disposed on the other one of the halves 552, 332 at diametrically opposing positions. The snap hooks 556, 336 are engageable with the recesses 557, 337 for interlocking the halves 552, 332.

The snap hooks 556, 336 include arms 3361 projecting from one of the halves 551, 331 towards the other one of the halves 551, 331. Each of the arms 3361 has a barbed end 3362 (see FIG. 3).

The tubular portion 551, 331 further includes two screw fasteners 55F, 33F, which extend from one of the halves 552, 332 to the other one of the halves 552, 332 and which respectively pass through a pair of the adjoining ends of the upper and lower frame sections 51, 31. A flexible enclosure 20 is mounted on the upper and lower frames 50, 30 and the posts 62, and has an annular wall 22 with an open top, and a circular bottom support 40 mounted on the lower frame 30 inside the enclosure 20. The annular wall 22 confines a space 21 therein. The enclosure 20 preferably has a plurality of sleeves 23 disposed on an outer circumferential surface of the annular wall 22 to permit passage of the posts 62 therethrough such that the annular wall 22 is prevented from inward shrinkage thereof relative to the upper and lower frames 50, 30. The enclosure 20 is further provided with a plurality of upper flaps 25 (see FIG. 1) which are disposed adjacent to the couplers 55 and which are capable of detachably fastening on the annular wall 22 so as to conceal the couplers 55.

Note that the upper and lower frame sections cannot be folded relative to each other once the frame sections are coupled by the couplers. Thus, accidentally injury of a child in the playpen of this invention can be avoided.

Figure 7:
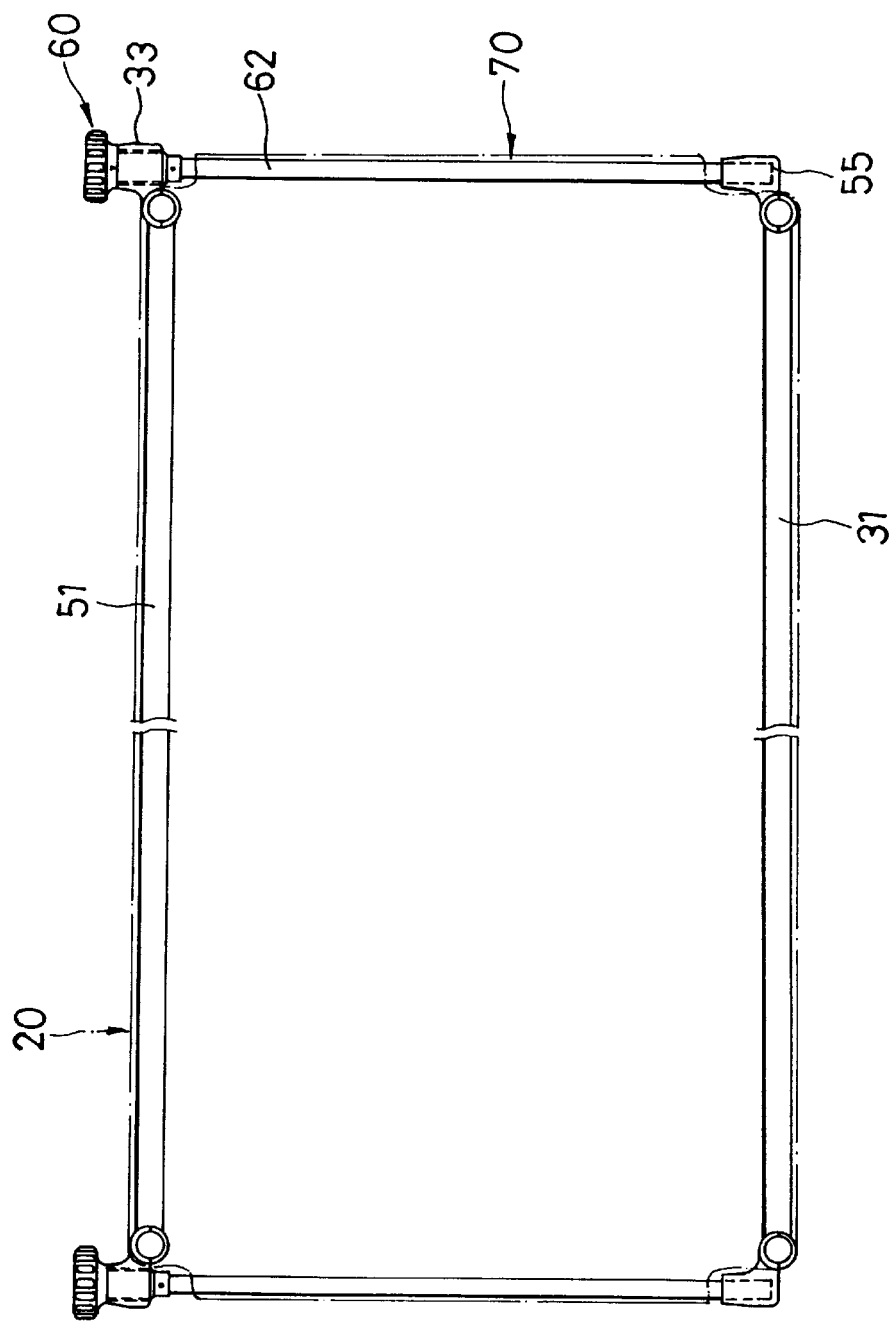
FIG. 7 is a side view of a modified preferred embodiment of this invention, wherein the enclosure is illustrated in dotted lines.

Referring to FIG. 7, a modified preferred embodiment is shown to be similar to the previous embodiment in construction except that the couplers 33, 55 used to interconnect the frame sections 51, 31 in the upper and lower frames 30, 50 are provided in reverse. The object and feature are the same as those of the previous embodiment.

With this invention thus explained, it is apparent that numerous modifications and variations can be made without departing from the scope and spirit of this invention. It is therefore intended that this invention be limited only as indicated in the appended claims.

I claim:

1. A playpen comprising:

a looped lower frame including a plurality of interconnected lower frame sections having adjoining ends;

a looped upper frame disposed above said looped lower frame, and including a plurality of interconnected upper frame sections having adjoining ends;

a plurality of couplers interconnecting said adjoining ends of said upper and lower frame sections, each of said couplers including a tubular portion which has two opposite open ends for insertion of said adjoining ends of a corresponding pair of said upper and lower frame sections, and a socket portion which projects from said tubular portion between said open ends and which has a socket hole, said socket portions of said couplers projecting outwardly along radial directions relative to said upper and lower frames, said socket holes extending in said socket portions along an axial direction relative said upper and lower frames; and a plurality of posts bridging said upper and lower frames and connected to said couplers, each of said posts having two ends respectively inserted into said socket hole of a corresponding one of said couplers in said upper frame and said socket hole of a corresponding one of said couplers in said lower frame, said tubular portion of each of said couplers including two halves of semi-circular cross-section, said socket portion being integrally connected to one of said halves, said tubular portion further including a plurality of snap hooks disposed on one of said halves at diametrically opposing positions, and a plurality of recesses disposed on the other one of said halves at diametrically opposing positions, said snap hooks being engageable with said recesses for interlocking said halves, said snap hooks including arms projecting from one of said halves towards the other one of said halves, each of said arms having a barbed end, said tubular portion further including two screw fasteners which extend from one of said halves to the other one of said halves and which respectively pass through said adjoining ends of a corresponding pair of said upper and lower frame sections.

2. The playpen as defined in claim 1, wherein said upper and lower frames are circular, said upper and lower frame sections being formed as arc-shaped tubes, said tubular portions of said couplers being arched.

3. The playpen as defined in claim 2, wherein said lower frame further includes a brace member extending across said lower frame, said brace member being connected to two opposing ends of said lower frame sections.

4. The playpen as defined in claim 2, wherein said socket hole in each of said couplers in said upper frame is a blind bore that receives one of said ends of the corresponding one of said posts.

5. The playpen as defined in claim 4, wherein said socket hole in each of said couplers in said lower frame is threaded, each of said couplers in said lower frame having an adjustable foot member extending through said threaded socket hole, said foot member having a pedestal, and a threaded hollow stem extending upward from said pedestal and inserted threadedly through said threaded socket hole, one of said ends of a corresponding one of said posts being inserted into said hollow stem.

6. The playpen as defined in claim 2, further comprising a flexible enclosure which is mounted on said upper and lower frames and said posts and which has an annular wall with an open top, and a circular bottom support mounted on said lower frame inside said enclosure.

7. A playpen comprising:

a looped lower frame including a plurality of interconnected lower frame sections having adjoining ends;

a looped upper frame disposed above said looped lower frame, and including a plurality of interconnected upper frame sections having adjoining ends;

a plurality of couplers interconnecting said adjoining ends of said upper and lower frame sections, each of said couplers including a tubular portion which has two opposite open ends for insertion of a pair of said adjoining ends of said upper and lower frame sections, and a socket portion which projects from said tubular portion between said open ends and which has a socket hole; and a plurality of posts bridging said upper and lower frames and connected to said couplers, each of said posts having two ends respectively supported by said socket portion of a corresponding one of said couplers in said upper frame and said socket portion of a corresponding one of said couplers in said lower frame, said tubular portion of each of said couplers comprising first and second portions, each of the first and second portions disposed on a respective side of at least a respective one of the frame sections, said first portion comprising at least one snap hook, said second portion comprising at least one recess, said snap hook engaged with the recess to hold the first and second portions together.

8. A playpen comprising:

a looped lower frame including a plurality of interconnected lower frame sections having adjoining ends;

a looped upper frame disposed above said looped lower frame, and including a plurality of interconnected upper frame sections having adjoining ends;

a plurality of couplers interconnecting said adjoining ends of said upper and lower frame sections, each of said couplers including a tubular portion which has two opposite open ends for insertion of a pair of said adjoining ends of said upper and lower frame sections, and a socket portion which projects from said tubular portion between said open ends and which has a socket hole;

a plurality of posts bridging said upper and lower frames and connected to said couplers, each of said posts having two ends respectively supported by said socket portion of a corresponding one of said couplers in said upper frame and said socket portion of a corresponding one of said couplers in said lower frame; and said tubular portion of each of said couplers comprising first and second portions that are formed as separate parts and are relatively movable with respect to one another, each of the first and second portions disposed on a respective side of at least a respective one of the frame sections, said tubular portion further comprising a fastener which extends from the first portion, through the respective one of the frame sections, through the second portion, said fastener securing the first and second portions together and securing the respective one of the frame sections to the first and second portions.

* * * * *